United States Patent [19]

Villette et al.

[11] Patent Number: 5,584,015

[45] Date of Patent: Dec. 10, 1996

[54] BUFFER MEMORY MANAGEMENT METHOD, RECORDING MEDIUM, AND COMPUTER SYSTEM INCORPORATING SAME

[75] Inventors: Michel Villette, Le Chesnay; Herve Servant, Guyancourt, both of France

[73] Assignee: Bull S.A., Louveciennes, France

[21] Appl. No.: 284,670

[22] PCT Filed: Dec. 21, 1993

[86] PCT No.: PCT/FR93/01285

§ 371 Date: Oct. 24, 1994

§ 102(e) Date: Oct. 24, 1994

[87] PCT Pub. No.: WO94/15292

PCT Pub. Date: Jul. 7, 1994

[30] Foreign Application Priority Data

Dec. 22, 1992 [FR] France .................................. 92 15519

[51] Int. Cl.$^6$ ................................................. G06F 13/00
[52] U.S. Cl. .......................... 395/463; 395/419; 395/456; 395/457; 395/460; 395/480; 395/487; 395/492; 395/497.04; 364/243.41; 364/245.2; 364/246.12; 364/960.1; 364/964.2; 364/964.27; 364/DIG. 1; 364/DIG. 2
[58] Field of Search ..................... 395/419, 456, 395/460, 463, 480, 487, 492, 497.04, 600

[56] References Cited

U.S. PATENT DOCUMENTS 4,636,946  1/1987  Hartung et al. ........................ 395/463

FOREIGN PATENT DOCUMENTS 0086886  8/1983  European Pat. Off. .
0509231  10/1992  European Pat. Off. .

OTHER PUBLICATIONS

IBM Technical Disclosure Bulletin, vol. 30, No. 5, Oct. 1987, New York, US; pp. 358–359, "Upgrading LRU Positions in Cache Management".

IBM Systems Journal, vol. 23, No. 2, 1984, Armonk, US; pp. 211–218; J. Z. Teng et al., "Managing IBM Database 2 Buffers to Maximize Performance".

Primary Examiner—Frank J. Asta
Attorney, Agent, or Firm—Kerkam, Stowell, Kondracki & Clarke, P.C.; Edward J. Kondracki

[57] ABSTRACT

A buffer memory management method for a buffer memory consisting of a set (14) of buffers (15), using a list of buffers arranged by order of least recent use (LRU). The method comprises, when a buffer (15) is referenced, classifying the buffer according to its position (p) relative to a threshold list position (t). The threshold position is advantageously defined according to the current buffer access hit rate. The method is suitable for operating the buffer memory with concurrent local and non-local processing.

33 Claims, 2 Drawing Sheets

BUFFER MEMORY MANAGEMENT METHOD, RECORDING MEDIUM, AND COMPUTER SYSTEM INCORPORATING SAME

FIELD OF THE INVENTION

The invention concerns a management method for set of buffers making up a buffer memory. It also has as subsidiary purposes a recording medium, such as a diskette or magnetic tape, incorporating software for implementing the method, as well as a computer system for implementing the method, and more particularly a data base management system, more popularly known by its acronym DBMS.

BACKGROUND OF THE INVENTION

A buffer memory constitutes a rapid, small-capacity interface between a processor and a generally slow, large-capacity data memory. The buffer memory is made up of a set of buffers intended to store extracts from the data memory. It can be a cache memory for receiving blocks of data from the data memory. The example chosen to illustrate the invention concerns the buffer memory of a DBMS. A DBMS is operated by the computer's operating system by means of a processor provided with virtual memory constituting all or part of the central memory of the computer and representative of the buffer memory. The extracts of data stored in the buffer memory are commonly pages of the refresh memory making up the data base. The buffer memory is therefore referred to as a pages cache memory. The management of the buffers in the cache memory is achieved by a buffer manager operated by the processor.

A distinction is usually made between two types of processing by the method, use of a buffer memory and, in particular, use of the pages cache memory in the example considered. The processing which frequently access a small number of pages in the cache memory is called local processing, and that less frequently accessing a large number of pages in the cache memory is referred to as non-local processing. For the simultaneous execution of local and non-local processing, the cache memory is divided under the control of the buffer manager. This division poses a major problem for managing the cache memory.

The buffer managers are currently and logically optimized for processing for local access. Ordinarily the cache memory is operated by an algorithm referred to as Least Recently Used (LRU). This algorithm draws up a list of the buffers in the cache memory according to the date of their last use. In principle, each time a buffer is referenced, the LRU rechains it to the head of the list. It follows that the buffers ahead of it in the list move down one place on the list. It is said that these buffers age by one place. When the buffer manager does not find a page in the cache memory, it requests the extraction of the page from the data base and its loading into the cache memory, while the LRU designates the buffer which was least recently referenced in order to record the new page. This optimization for local processing is especially unsuitable to the simultaneous operation of the cache memory for non-local processing. In effect, the access to new pages occurs much more frequently for non-local processing. There then follows a rapid modification of the head of the LRU list, and therefore a premature aging of the content of the other buffers. This premature aging greatly disturbs the management of local processing, and considerably slows down its execution.

Another problem, which stems from the rechaining at the head of the LRU list of the recently referenced buffers, arises especially in a multiprocessor environment. The rechaining to the head of the list must be independent in order to preserve the integrity of the list. In a multiprocessor system, this makes it necessary to take an exclusive lock during the dechaining and rechaining operation in order to move the buffer in the list. Taking an exclusive lock constitutes what is known as a critical section. A critical section can only be executed by a single processor at a given instant, and thus causes the multiprocessor's production to deteriorate.

The invention solves both these problems by permitting the optimization of the management of a set of buffers operated by local and non-local processing at the same time.

SUMMARY OF THE INVENTION

The invention has as its purpose a method for managing a set of buffers by means of a list which arranges the buffers by order of their least recent utilization (LRU), with the distinguishing characteristic that it consists of arranging the buffer according to its position with respect to a threshold position on the list, when one of the buffers is referenced.

As a corollary, the invention also has as its purpose a computer system which includes a processor connected to a data memory through a set of buffers operated by a buffer manager, according to an LRU algorithm, with the distinguishing characteristic that it includes the means for generating at least one threshold position, and a means of comparison connected to the generating means and to the algorithm.

The invention also has the subsidiary purpose of a recording medium with the characterized by the fact that it includes software for implementing the method.

BRIEF DESCRIPTION OF THE DRAWINGS

The characteristics and advantages of the invention are brought out in the following descriptions, given by way of example and illustrated in the attached drawings.

In these drawings.

DETAILED DESCRIPTION OF THE PREFERRED EMBODIMENTS

Figure 1:
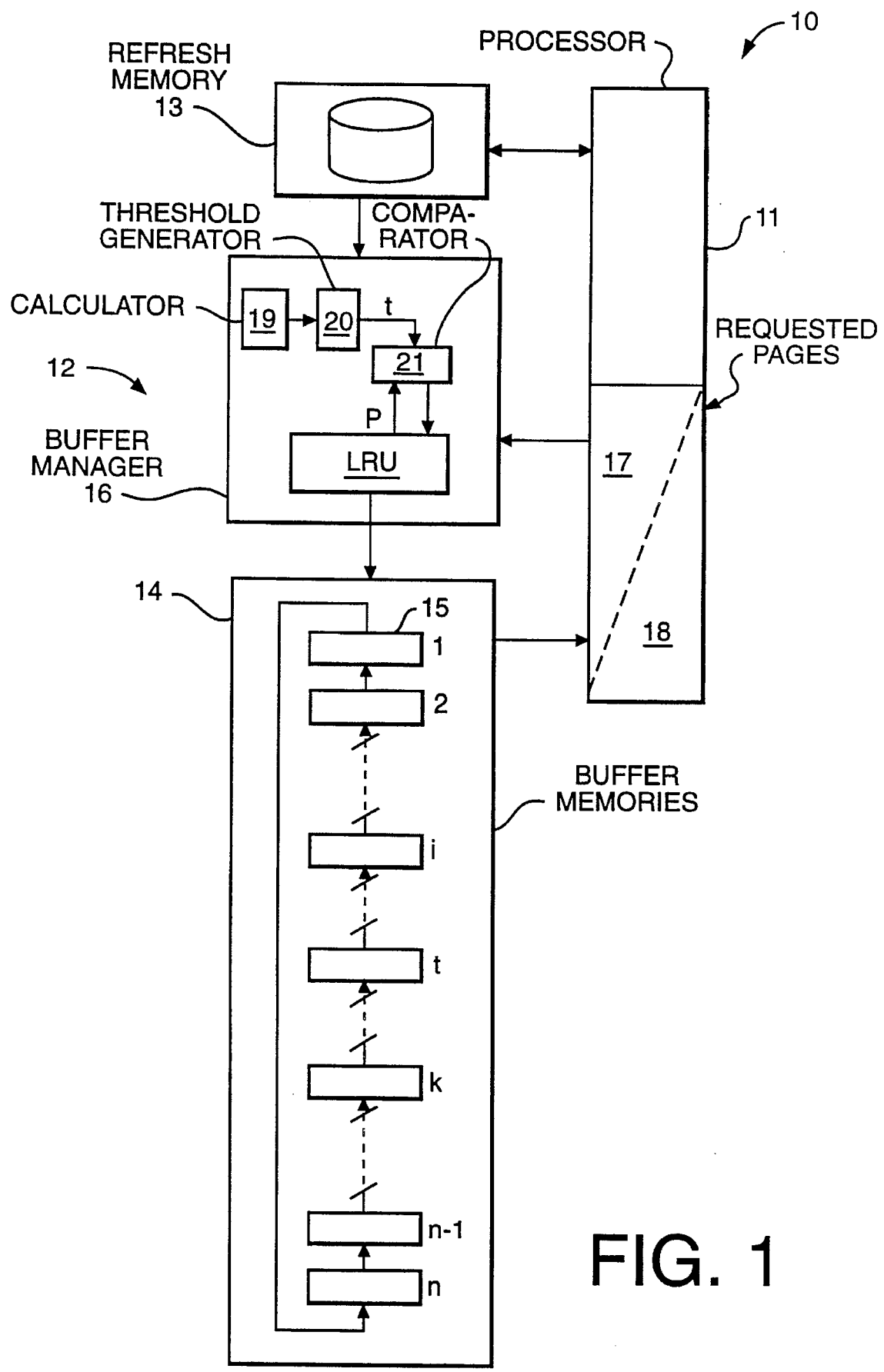
FIG. 1 is an overall view of a computer system in conformity with the invention made up of a management system for a data base and including a set of buffers operated according to the method of the invention.

FIG. 1 represents with an overall view a computer system 10 comprising a central processor 11 connected by means of a central memory 12 to a refresh memory 13 constituting a data base in the example. The central memory 12 thus acts as a buffer memory between the central processor 11 and the data base 13. The central memory 12 includes a set 14 of n buffer memories 15 and a manager 16 of the set 14 based on an LRU algorithm. The n buffers 15 are each suitable for storing an extract from the data base 13, one page of 4 kilobytes in the example given. The n buffers 15 are chained in an order 1, 2, ... n determined by the LRU. The processor 11 accesses the set 14 to implement local processing 17 and non-local processing 18. Under the control of the manager 16 the pages requested for processing 17 and 18 are copied in the set 14 starting from the external data base 13. The set 14 is thus divided between simultaneous local and non-local processing.

The computer system 10 also contains in the standard manner, in this case in the manager 16 as illustrated, a device 19 for calculating the current number of pages in the set 14 with respect to the total number of pages requested by the processor. This rate is currently referred to as the buffer access hit rate. It is said that there is a hit when the address of a page requested by the processor 11 is one of the addresses contained in the directory of the buffer set. The hit rate is regularly updated, for example at every 1,000 references.

Figure 2:
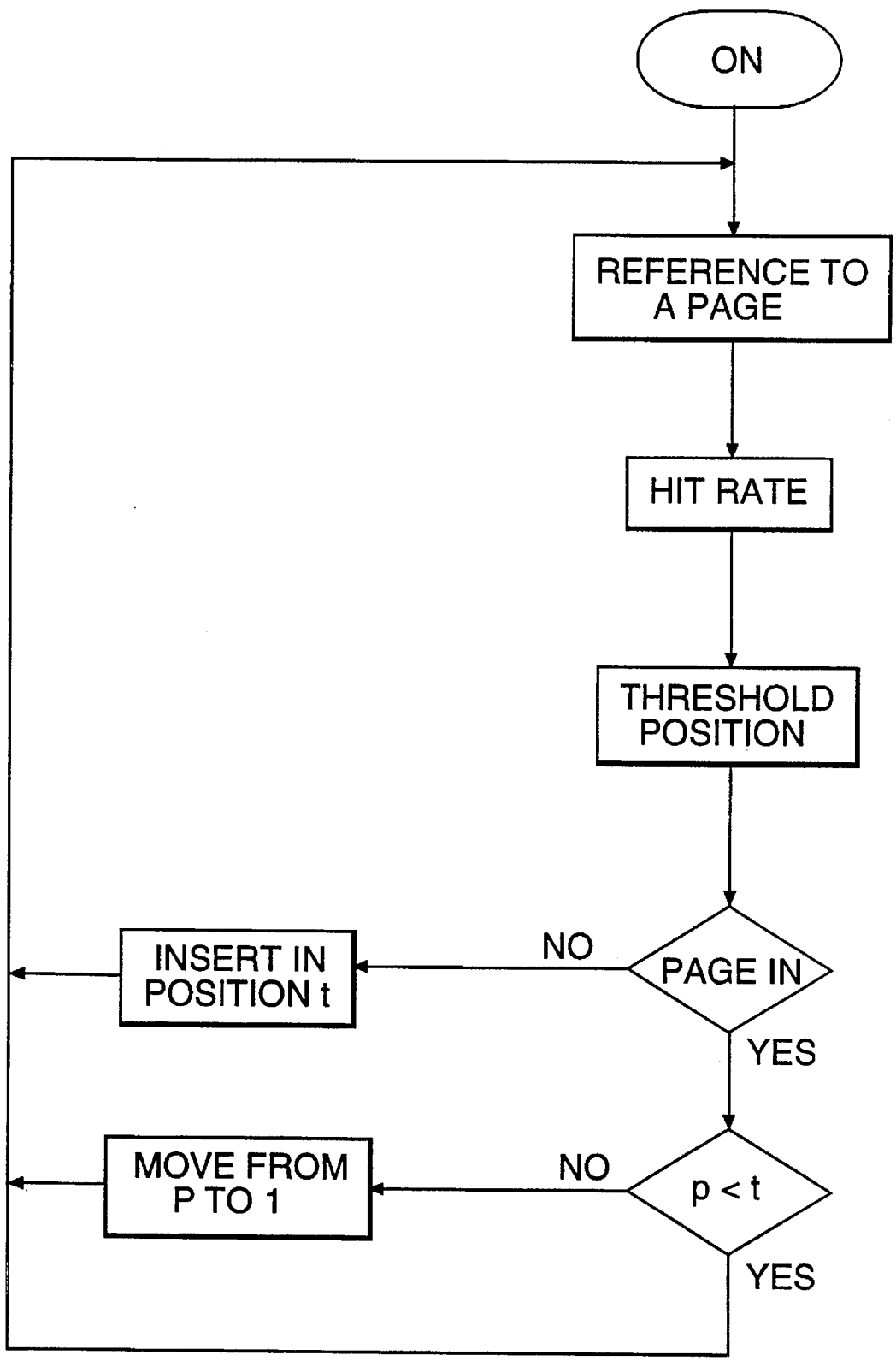
FIG. 2 illustrates, by means of a flow chart, a method for managing a set of buffers represented in FIG. 1

According to the invention, when a buffer is referenced, it is arranged in the list by the manager 16 according to its position p with respect to a threshold position t on the list. An illustrative example of the method according to the invention is represented by the flow chart in FIG. 2.

Consider, for example, that the set 14 is made up of 1,000 buffers 15 (n=1,000). In the example, the threshold position t is defined in relation to the buffer access hit ratio. The function selected in the example given is the simple correspondence of the hit rate to the number of buffers in the set 14. In this way, if the hit rate is 85%, for example, the threshold position t in the set 14 of 1,000 buffers 15 corresponds to the position t=850. The information device 10 contains, preferably in the manager 16 as illustrated, a generator 20 of the threshold position which receives the hit rate provided by the device 19 and a position comparison device 21 receiving from the generator 20 the threshold position t and from the LRU the position p of the buffer referenced in the list.

If a referenced page is already in the set 14, the position p of the buffer incorporating it is compared with the threshold position t. If the position p is a position i preceding the position t as illustrated in FIG. 1, that is, if p<t, the manager 16 does not change the position i of the buffer 15. It is therefore considered that the page requested is in a stable or fresh portion of the list. In other words, all the working set pages placed in front of the threshold position t are not aged after the reading of a page. On the other hand, if position p is a position k corresponding to the threshold position or one following it, that is, if p≧t, it is put at the head of the list. Aging takes place only in this case.

If the requested page is not found in the set 14, it is placed in the threshold position t so that the reading of this page does not age the pages in the stable zone, which are considered as active. In this way, only if the page is referenced again will it be chained to the head of the list, in conformity with the preceding comparison criteria.

The example illustrating the method of the invention can have many variations. In this method, the determination of the threshold position t is a simple correspondence of this rate with the total positions in the LRU list. However, it is clear that the determination of the threshold position can be a more sophisticated function of the value of the hit ratio, being capable of leading to a changing threshold position t, or to several threshold values. For example, an initial threshold position $t_1$ could be the one previously defined for the insertion of a new page and the comparison of a present page position p, and another position $t_2$ could have a lesser value, for example, $t_2=t_1/2$ to correspond to a first rechaining. In this way, one page already present and having a position following threshold position $t_1$ could be rechained to position $t_2$. In another example, the threshold position t could be a fixed predetermined value for a range of hit rate values. For example, the threshold position t would be 900 for a ratio between 80% and 100%, 700 for a ratio between 60% and 80%, etc. Of course, this example can be combined with the preceding one. On the other hand, even though the threshold position t chosen in the illustrated example is defined in relation to the buffer access hit ratio, it is clear that it can be simply a predetermined fixed position. Thus, the method consists of comparing the position p with one or more fixed threshold positions. In this way it is understood that, more generally, a variable threshold position could be defined in relation to a different parameter than the hit ratio and that a variable position could be added to a fixed position.

In a general way, it follows from these considerations that the method of the invention is related to the management of a set of buffers by means of a list which arranges the buffers by the order of their least recent utilization (LRU) and consists, when a buffer is referenced, of arranging the buffer in relation to its position p with respect to a threshold position in the list. The threshold position can be fixed or variable. If it is variable, it will be appropriately defined in relation to the buffer access hit ratio. If the information, a page in the illustrated example, is already present in the referenced buffer, the method of the invention consists of maintaining the buffer's position if it precedes the threshold position, and of rechaining it in the list in the contrary case. It has been seen that the rechaining can be carried out to the head of the list, or to another threshold position $t_2$ which precedes it. If the referenced buffer receives any new information, the method of the invention consists of placing it in the threshold position. If there are several threshold positions, the buffer will be placed in the last threshold position.

Moreover, even though the example has to do with a buffer memory in relation to a data base as a data memory, we have seen that the invention can be applied to every buffer memory between any processor and any memory, referred to as a data memory to avoid any ambiguity. In the particular case of a central processor, the data memory would be the central memory of the computer system. The invention thus has as its further purpose a computer system comprising a processor connected to a data memory by means of a set of buffers managed by a manager according to an LRU algorithm, means for generating at least one threshold position, and means of comparison connected to the generating devices and the LRU. Preferably, if the computer system includes a device for calculating the current buffer access hit rate, the device will be connected to the generating means in order to define at least one of the threshold positions in relation to the buffer access hit ratio.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the spirit and scope of the invention as set forth herein and defined in the claims.

We claim:

1. A buffer memory management method for a buffer memory having a set (14) of buffers (15) for storing respective desired information, the method comprising:

referencing said set of buffers and classifying said buffers in a list by order of their least recent utilization (LRU), determining a threshold position (t) in said list of buffers in relation to a current buffer access hit rate and, when a buffer is referenced at a position (p) in said list, said classifying step further comprises classifying said referenced buffer in relation to said position (p) relative said threshold position (t) in said list of buffers.

2. A method according to claim 1, said step of further classifying comprises, when the desired information is already in said referenced buffer, maintaining said referenced buffer's position when said referenced buffer position precedes said threshold position, and rechaining said referenced buffer in said list of buffers if the contrary holds.

3. A method according to claim 2, further comprising determining in said list of buffers at least one additional threshold position preceding said threshold position and wherein said referenced buffer receives the desired information and said step of further classifying comprises placing said referenced buffer at that of said at least one additional threshold position nearest said threshold position.

4. A method according to claim 3, wherein the nearest additional threshold position is determined in relation to said current buffer access hit rate.

5. A method according to claim 3, wherein said nearest additional threshold position has a predetermined fixed value.

6. A method according to claim 2, wherein said step of rechaining said referenced buffer advances said referenced buffer to a position preceding the threshold position.

7. A method according to claim 2, wherein said referenced buffer receives the desired information and said step of further classifying comprises placing said referenced buffer at said threshold position.

8. A method according to claim 2, wherein said list of buffers has a head buffer and said step of rechaining said referenced buffer advances said referenced buffer to be said head buffer.

9. A method according to claim 1, wherein said referenced buffer receives the desired information and said step of further classifying comprises placing said referenced buffer at said threshold position.

10. A method according to claim 1, further comprising determining in said list of buffers at least one additional threshold position preceding said threshold position and wherein said referenced buffer receives the desired information and said step of further classifying comprises placing said referenced buffer at that of said at least one additional threshold position nearest said threshold position.

11. A method according to claim 10, wherein said nearest additional threshold position is determined in relation to said current buffer access hit rate.

12. A method according to claim 10, wherein said nearest additional threshold position has a predetermined fixed value.

13. A method according to claim 1, further comprising determining at least one additional threshold position in relation to said current buffer access hit rate.

14. A method according to claim 1, further comprising determining at least one additional threshold position having a predetermined fixed value.

15. A method according to claim 1, wherein said threshold position has a predetermined fixed value corresponding to a predetermined range of values of said current buffer access hit rate.

16. A computer system (10) comprising a data memory, processor (11) connected to the data memory (12) through a set of buffers (15), means (16) for classifying said buffers in a list according to an LRU algorithm, means (20) for determining a threshold position (t) in said list, means (19) for calculating a current buffer access hit rate, said means (19) for calculating being connected to said determining means (20) in order to determine said threshold position in relation to said current buffer access hit rate, comparison means (21) connected to said determining means and said classifying means for comparing said threshold position with a position (p) of a referenced buffer in said list, and means (16) for further classifying said referenced buffer in said list in relation to said position (p) relative to said threshold position (t).

17. A system according to claim 16, wherein said threshold position has a predetermined fixed value corresponding to a predetermined range of values of said current buffer access hit rate.

18. A system according to claim 16, wherein said determining means also determines at least one additional threshold position.

19. A system according to claim 18, wherein said at least one additional threshold position is also determined in relation to said current buffer access hit rate.

20. A system according to claim 19, wherein said at least one additional threshold position has a predetermined fixed value corresponding to a respective predetermined range of values of said current buffer access hit rate.

21. A system according to claim 19, wherein said at least one additional threshold position has a predetermined fixed value.

22. A buffer memory management method for a buffer memory having a set (14) of buffers (15) for storing respective desired information, the method comprising: referencing said set of buffers and classifying said buffers in a list by order of their least recent utilization (LRU), determining a threshold position (t) in said list of buffers in relation to a current buffer access hit rate and, when a buffer is referenced at a position (p) in said list, said classifying step further comprises classifying said referenced buffer in relation to said position (p) relative to said threshold position (t) in said list of buffers whereby said method is optimized when said set of buffers are operated by simultaneous local and non-local processing.

23. A method according to claim 22, said step of further classifying comprises, when the desired information is already in said referenced buffer, maintaining said referenced buffer's position when said referenced buffer's position precedes said threshold position, and rechaining said referenced buffer in said list of buffers when the referenced buffer's position does not precede said threshold position.

24. A method according to claim 23, wherein said step of rechaining said referenced buffer advances said referenced buffer to a position preceding the threshold position.

25. A method according to claim 22, wherein said referenced buffer receives the desired information and said step of further classifying comprises placing said referenced buffer at said threshold position.

26. A method according to claim 22, further comprising determining in said list of buffers at least one additional threshold position preceding said threshold position and wherein said referenced buffer receives the desired information and said step of further classifying comprises placing said referenced buffer at that of said at least one additional threshold position nearest said thresholds position.

27. A method according to claim 22, further comprising determining at least one additional threshold position in relation to said current buffer access hit rate.

28. A computer system (10) comprising a data memory, a set of buffers and a processor (11) connected to the data memory (12) through the set of buffers (15), said set of buffers (15) being operated by local and non-local processing means (16) for classifying said buffers in a list according to a LRU algorithm, means (20) for determining a threshold position (t) in said list, means (19) for calculating a current buffer access hit rate, said means (19) for calculating being connected to said determining means (20) in order to determine said threshold position in relation to said current buffer access hit rate, comparison means (21) connected to said determining means and said classifying means for comparing said threshold position with a position (p) of a referenced buffer in said list, and means (16) for further classifying said referenced buffer in said list in relation to said position (p) relative to said threshold position (t).

29. A system according to claim 28, wherein said threshold position has a predetermined fixed value corresponding to a predetermined range of values of said current buffer access hit rate.

30. A system according to claim 28, wherein said determining means also determines at least one additional threshold position.

31. A system according to claim 30, wherein said at least one additional threshold position is also determined in relation to said current buffer access hit rate.

32. A system according to claim 31, wherein said at least one additional threshold position has a predetermined fixed value corresponding to a respective predetermined rate of values of said current buffer access hit rate.

33. A system according to claim 31, wherein said at least one additional threshold position has a predetermined fixed value.

* * * * *